US008782208B2

(12) United States Patent
Belinchón Vergara et al.

(10) Patent No.: US 8,782,208 B2
(45) Date of Patent: Jul. 15, 2014

(54) METHOD AND APPARATUS FOR USE IN A COMMUNICATIONS NETWORK

(75) Inventors: Maria Carmen Belinchón Vergara, Getafe (ES); Germán Blanco, Paracuellos del Jarama (ES); Juan Manuel Fernandez Galmes, Getafe (ES); Hubert Przybysz, Hägersten (SE); Andreas Schumacher, Stockholm (SE); Stephen Terrill, Villanueva de la Cañada (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1101 days.

(21) Appl. No.: 12/670,192

(22) PCT Filed: Jul. 23, 2007

(86) PCT No.: PCT/EP2007/057589
§ 371 (c)(1),
(2), (4) Date: Jun. 15, 2010

(87) PCT Pub. No.: WO2009/012813
PCT Pub. Date: Jan. 29, 2009

(65) Prior Publication Data
US 2010/0257272 A1    Oct. 7, 2010

(51) Int. Cl.
*G06F 15/173* (2006.01)
*G06F 15/16* (2006.01)

(52) U.S. Cl.
USPC .......................................... 709/224; 709/227

(58) Field of Classification Search
USPC ................................................ 709/224, 227
See application file for complete search history.

(56) References Cited

U.S. PATENT DOCUMENTS

| 7,286,521 | B1 * | 10/2007 | Jackson et al. ................ 370/352 |
| 2002/0010767 | A1 * | 1/2002 | Farrow et al. ................ 709/223 |
| 2005/0136926 | A1 | 6/2005 | Tammi et al. |
| 2007/0046253 | A1 | 3/2007 | Ayers et al. |

(Continued)

FOREIGN PATENT DOCUMENTS

WO    WO 2006/016839    2/2006

OTHER PUBLICATIONS

U.S. Appl. No. 12/670,189, filed Jan. 22, 2010; Inventor: Vergara et al.

(Continued)

*Primary Examiner* — Hee Soo Kim
(74) *Attorney, Agent, or Firm* — Nixon & Vanderhye, P.C.

(57) ABSTRACT

A method is disclosed for use by an Interrogating Call/Session Control Function (I-CSCF) of an IP Multimedia Subsystem (IMS). In the method, a Session Initiation Protocol (SIP) message is received by the I-CSCF, which the I-CSCF attempts to forward to a Serving Call/Session Control Function (S-CSCF) of the IMS assigned to provide services to a user. If the attempt is determined to have failed, the I-CSCF sends a message to a Home Subscriber Server (HSS) of the IMS to request capabilities information for selecting a S-CSCF, the request message also providing first information relating to the status of the assigned S-CSCF. On receipt of the capabilities information at the I-CSCF from the HSS, the I-CSCF selects a replacement S-CSCF to provide services to the user. Related methods are also disclosed for use by the HSS and S-CSCF.

35 Claims, 8 Drawing Sheets

(56) References Cited

U.S. PATENT DOCUMENTS

| | | |
|---|---|---|
| 2007/0147244 A1 | 6/2007 | Rasanen |
| 2007/0207805 A1 | 9/2007 | Pallares Lopez et al. |
| 2007/0211694 A1 | 9/2007 | Rasanen |
| 2007/0275710 A1 | 11/2007 | Mayer et al. |
| 2007/0287454 A1* | 12/2007 | Zhu et al. .................... 455/435.1 |
| 2008/0256251 A1* | 10/2008 | Huotari et al. ................ 709/229 |
| 2008/0274739 A1 | 11/2008 | Wu |
| 2010/0062767 A1* | 3/2010 | Leis et al. .................. 455/435.1 |

OTHER PUBLICATIONS

International Search Report for PCT/EP2007/057590, mailed Apr. 4, 2008.
International Search Report for PCT/EP2007/057589, mailed Mar. 5, 2008.
Office Action mailed Aug. 17, 2012 in related U.S. Appl. No. 12/670,189 (13 pages).
Office Action mailed Mar. 29, 2013 in related U.S. Appl. No. 12/670,189 (16 pages).

* cited by examiner

FIG. 8

| Cx message | Source | Destination | Command-Name | Abbrev. |
|---|---|---|---|---|
| Cx-Query + Cx-Select-Pull | I-CSCF | HSS | User-Authorization-Request | UAR |
| Cx-Query Resp + Cx-Select-Pull Resp | HSS | I-CSCF | User-Authorization-Answer | UAA |
| Cx-Put + Cx-Pull | S-CSCF | HSS | Server-Assignment-Request | SAR |
| Cx-Put Resp + Cx-Pull Resp | HSS | S-CSCF | Server-Assignment-Answer | SAA |
| Cx-Location-Query | I-CSCF | HSS | Location-Info-Request | LIR |
| Cx-Location-Query Resp | HSS | I-CSCF | Location-Info-Answer | LIA |
| Cx-AuthDataReq | S-CSCF | HSS | Multimedia-Authentication-Request | MAR |
| Cx-AuthDataResp | HSS | S-CSCF | Multimedia-Authentication-Answer | MAA |
| Cx-Deregister | HSS | S-CSCF | Registration-Termination-Request | RTR |
| Cx-Deregister Resp | S-CSCF | HSS | Registration-Termination-Answer | RTA |
| Cx-Update_Subscr_Data | HSS | S-CSCF | Push-Profile-Request | PPR |
| Cx-Update_Subscr_Data Resp | S-CSCF | HSS | Push-Profile-Answer | PPA |

METHOD AND APPARATUS FOR USE IN A COMMUNICATIONS NETWORK

This application is the U.S. national phase of International Application No. PCT/EP2007/057589, filed 23 Jul. 2007, which designated the U.S., the entire contents of which is hereby incorporated by reference.

TECHNICAL FIELD

The present invention relates, at least in part, to a method and apparatus for use in a communications network, for example a Universal Mobile Telecommunications System having an IP Multimedia Subsystem.

BACKGROUND

IP Multimedia services provide a dynamic combination of voice, video, messaging, data, etc. within the same session. By growing the number of basic applications and the media that it is possible to combine, the number of services offered to the end users will grow, and the inter-personal communication experience will be enriched. This will lead to a new generation of personalised, rich multimedia communication services, including so-called "combinational IP Multimedia" services.

The UMTS (Universal Mobile Telecommunications System) is a third generation wireless system designed to provide higher data rates and enhanced services to subscribers. UMTS is a successor to the Global System for Mobile Communications (GSM), with an important evolutionary step between GSM and UMTS being the General Packet Radio Service (GPRS). GPRS introduces packet switching into the GSM core network and allows direct access to packet data networks (PDNs). This enables high-data rate packets switch transmissions well beyond the 64 kbps limit of ISDN through the GSM call network, which is a necessity for UMTS data transmission rates of up to 2 Mbps. UMTS is standardised by the 3$^{rd}$ Generation Partnership Project (3GPP) which is a conglomeration of regional standards bodies such as the European Telecommunication Standards Institute (ETSI), the Association of Radio Industry Businesses (ARIB) and others. See 3GPP TS 23.002 for more details.

The UMTS architecture includes a subsystem known as the IP Multimedia Subsystem (IMS) for supporting traditional telephony as well as new IP multimedia services (3GPP TS 22.228, TS 23.228, TS 24.229, TS 29.228, TS 29.229, TS 29.328 and TS 29.329 Releases 5 to 7). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS is able to connect to both PSTN/ISDN (Public Switched Telephone Network/Integrated Services Digital Network) as well as the Internet.

The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. The 3GPP has chosen SIP for signalling between a User Equipment (UE) and the IMS as well as between the components within the IMS.

Specific details of the operation of the UMTS communications network and of the various components within such a network can be found from the Technical Specifications for UMTS that are available from http://www.3gpp.org. Further details of the use of SIP within UMTS can be found from the 3GPP Technical Specification TS 24.228 V5.8.0 (2004-03).

FIG. 1 of the accompanying drawings illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the address at which a SIP user identity can be reached. In 3GPP, when a SIP terminal performs a registration, the IMS authenticates the user, and allocates a S-CSCF to that user from the set of available S-CSCFs. Whilst the criteria for allocating S-CSCFs is not specified by 3GPP, these may include load sharing and service requirements. It is noted that the allocation of an S-CSCF is key to controlling (and charging for) user access to IMS-based services. Operators may provide a mechanism for preventing direct user-to-user SIP sessions which would otherwise bypass the S-CSCF.

During the registration process, it is the responsibility of the I-CSCF to select an S-CSCF if a S-CSCF is not already selected. The I-CSCF receives the required S-CSCF capabilities from the home network's Home Subscriber Server (HSS), and selects an appropriate S-CSCF based on the received capabilities. (It is noted that S-CSCF allocation is also carried out for a user by the I-CSCF in the case where the user is called by another party, and the user is not currently allocated an S-CSCF.) When a registered user subsequently sends a session request to the IMS, the P-CSCF is able to forward the request to the selected S-CSCF based on information received from the S-CSCF during the registration process.

Within the IMS service network, Application Servers (ASs) are provided for implementing IMS service functionality. Application Servers provide services to end-users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment. Different IFCs may be applied to different call cases. The IFCs are received by the S-CSCF from an HSS during the IMS registration procedure as part of a user's User Profile. Certain Application Servers will perform actions dependent upon subscriber identities (either the called or calling subscriber, whichever is "owned" by the network controlling the Application Server). For example, in the case of call forwarding, the appropriate (terminating) application server will determine the new terminating party to which a call to a given subscriber will be forwarded. In the case that an IFC indicates that a SIP message received at the S-CSCF should be forwarded to a particular SIP AS, that AS is added into the message path. Once the SIP message is returned by the AS to the S-CSCF, it is forwarded on towards its final destination, or forwarded to another AS if this is indicated in the IFCs.

As appreciated by the applicant, the IMS does not specify any procedure by which an IMS node advertises the adjacent nodes (or far end nodes) about a temporary unavailability due to, for example, a restart, local maintenance operations such as software (SW) upgrades, and so on, and the later recovery.

The lack of such a procedure can cause some interference in the usual function of the applications involved.

It is desirable to address the above-identified issue.

The following is a list of some of the previously-considered procedures for recovery situations:

GSM Restoration procedures: In this specification it is described the methods by means of which nodes like HLR, VLR, SGSN, GGSN restore user data after their loss of corruption. See "3rd Generation Partnership Project; Technical Specification Group Core Network; Restoration procedures (Release 6)" (3GPP TS 23.007 V6.1.0).

Radius Charging ON-OFF: When a Radius Charging client recovers from an unavailability situation, it advertises the charging server about the event so that the charging server closes all sessions related with the affected client (i.e. those charging sessions opened for users which use the affected client). See RFC 2865 "Remote Authentication Dial In User Service (RADIUS)".

MTP 3 Restart: once the MTP 3 layer recovers from a restart (unavailability), it begins an advertising procedure toward the adjacent nodes, so that they can reconfigure their routing tables accordingly and notifies their respective users about the event for taking the proper actions. See "Specifications of Signalling System No. 7-Message transfer part; Signalling network functions and messages", ITU-T Recommendation Q.704.

SCCP Restart: similar to the MTP 3 Restart but at SCCP level and advertising only the concerned subsystems.

M3UA Restart: Equivalent to the MTP 3 Restart but for SIGTRAN.

Diameter peer restart: This is detected with the DWR/DWA messages specified in IETF RFC 3588.

Diameter application restart: This is indicated with the Origin-State-Id AVP specified in IETF RFC 3588.

It is desirable to address the above-identified issue.

SUMMARY

According to a first aspect of the present invention there is provided a method for use by an Interrogating Call/Session Control Function, I-CSCF, of an IP Multimedia Subsystem, IMS, comprising: receiving a Session Initiation Protocol, SIP, message; attempting to forward the SIP message to a Serving Call/Session Control Function, S-CSCF, of the IMS assigned to provide services to a user; if the attempt is determined to have failed, sending a message to a Home Subscriber Server, HSS, of the IMS to request capabilities information for selecting a S-CSCF, the request message also providing first information relating to the status of the assigned S-CSCF; and on receipt of the capabilities information from the HSS, selecting a replacement S-CSCF to provide services to the user.

The method may comprise forwarding the SIP message to the replacement S-CSCF with second information relating to the status of the assigned S-CSCF.

According to a second aspect of the present invention there is provided a method for use by a Home Subscriber Server, HSS, of an IP Multimedia Subsystem, IMS, comprising: receiving from an Interrogating Call/Session Control Function, I-CSCF, of the IMS a message to request capabilities information for selecting a Serving Call/Session Control Function, S-CSCF, the request message also providing first information relating to the status of a S-CSCF assigned to provide services to the user; and in dependence upon the first information, setting an indicator maintained at or accessible to the HSS so as to indicate an uncertain status in relation to the assigned S-CSCF.

The method may comprise subsequently receiving a Session Initiation Protocol, SIP, message from a S-CSCF other than the assigned S-CSCF; checking the indicator to determine whether it is set to indicate an uncertain status in relation to the assigned S-CSCF and, if so, replacing the assigned S-CSCF with the other S-CSCF as being the S-CSCF assigned to provide services to the user; and updating the indicator so as not to indicate an uncertain status in relation to the newly-assigned S-CSCF.

The method may comprise rejecting the SIP message if it is determined that the indicator is not set to indicate an uncertain status in relation to the assigned S-CSCF.

The method may comprise setting the indicator to indicate an uncertain status in relation to the assigned S-CSCF if the first information suggests that the assigned S-CSCF is at least to some extent non-responsive.

According to a third aspect of the present invention there is provided method for use by a Serving Call/Session Control Function, S-CSCF, of an IP Multimedia Subsystem, IMS, comprising: receiving a Session Initiation Protocol, SIP, message from an Interrogating Call/Session Control Function, I-CSCF, of the IMS with second information relating to the status of a S-CSCF, different to the claimed S-CSCF, assigned to provide services to a user; and storing in the S-CSCF receiving said message the received second information in relationship with information about said user held in said S-CSCF.

The first/second information may indicate that the assigned S-CSCF is at least to some extent non-responsive.

The first/second information may identify the assigned S-CSCF.

The first/second information may provide an indication of a problem being experienced by the assigned S-CSCF.

The SIP message may be a SIP Register message.

The SIP message may be a SIP Invite message.

The first information may be sent in a Diameter message.

The Diameter message carrying the first information may be a User-Authorization Request, UAR, or a Location-Info-Request, LIR, message.

The second information may be sent in a SIP message.

The SIP message carrying the second information may be a REGISTER or INVITE message.

The first/second information may comprise information relating to an operational status of the assigned S-CSCF.

The first/second information may comprise information relating to a reason for the assigned S-CSCF being in the specified status.

According to a fourth aspect of the present invention there is provided apparatus for use in an IP Multimedia Subsystem, the apparatus comprising means for performing a method according to any of the first to third aspects of the present invention.

Where a message is stated as being from a user or sent to a particular node, for example, it is to be understood that this is intended as including the case where the message is not sent directly from the user or to the particular node, but via other nodes as well.

According to a fifth aspect of the present invention there is provided a program for controlling an apparatus to perform a method according to any of the first to third aspects of the present invention or which, when loaded into an apparatus, causes the apparatus to become an apparatus according to the fourth aspect of the present invention. The program may be carried on a carrier medium. The carrier medium may be a storage medium. The carrier medium may be a transmission medium.

According to a sixth aspect of the present invention there is provided an apparatus programmed by a program according to the fifth aspect of the present invention.

According to a seventh aspect of the present invention there is provided a storage medium containing a program according to the fifth aspect of the present invention.

BRIEF DESCRIPTION OF THE DRAWINGS

FIG. 8 provides a table that defines the mapping between stage 2 operations and stage 3 flows using the DIAMETER protocol.

DETAILED DESCRIPTION

Because of the lack of specified procedures in the current IMS standard as mentioned above, failure of an S-CSCF may result in incorrect processing of sessions, or not processing the sessions at all.

Before a description embodiments of the present invention, two use cases will be described so explain the context in which embodiment of the present invention will operate. In these use cases, a S-CSCF is assumed to experience a persistent failure of some sort.

Figure 1:
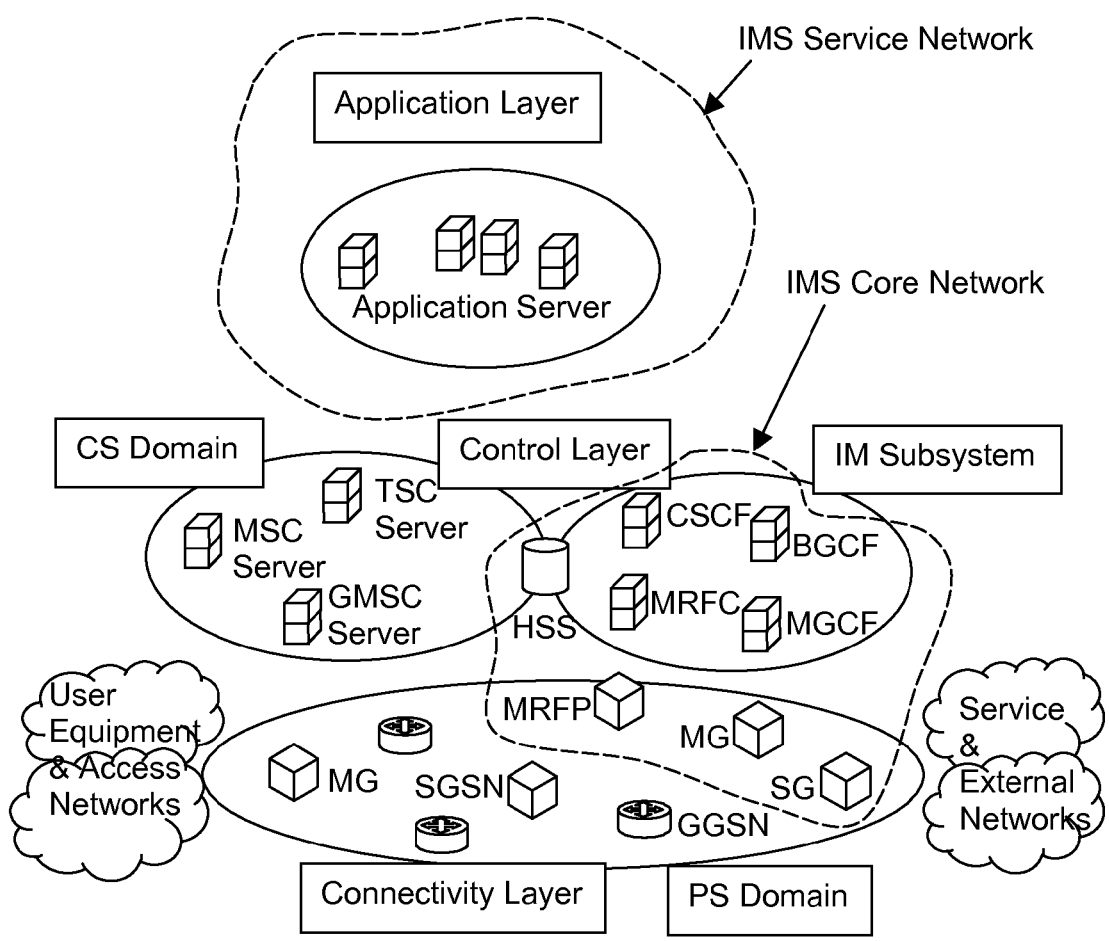
FIG. 1, discussed hereinbefore, illustrates schematically the integration of an IP Multimedia Subsystem into a 3G mobile communications system.
Figure 2:
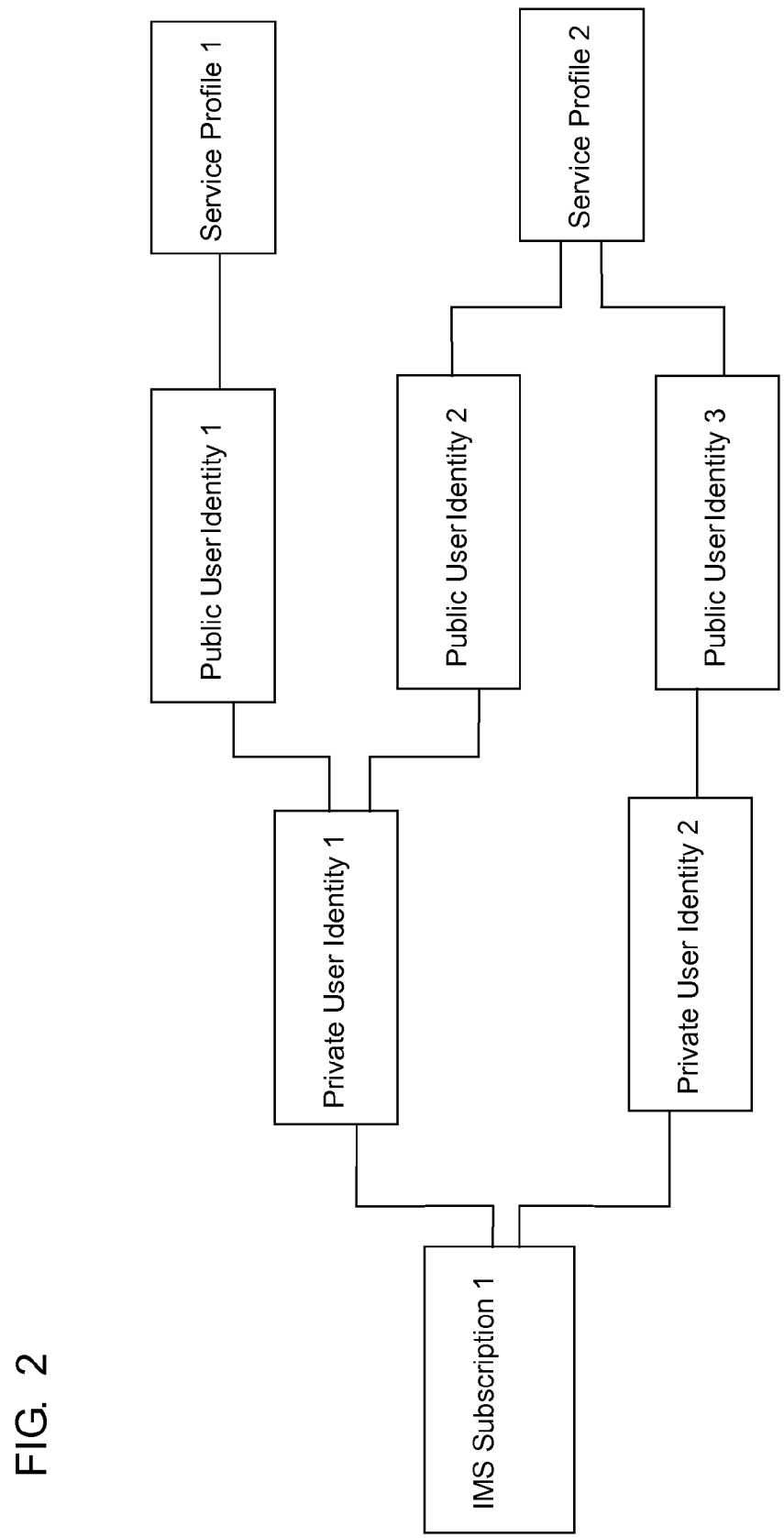
FIG. 2 is a block diagram illustrating a Data Model example used as a basis for the use cases described herein.

For simplicity, the Data Model example depicted in FIG. 2 will be taken as a base. It is assumed that there is an S-CSCF1 assigned to an IMS Subscription, i.e.:

either the IMPI1 (IP Multimedia Private User Identity) is already registered/unregistered with another IMPU (IP Multimedia Public User Identity), or the IMPU1 was unregistered, or any other IMPI within the IMS Subscription is registered or unregistered In a network where ALL queries are authenticated, a handover of S-CSCFs would be allowed, since the HSS would receive a Multimedia-Auth-Request Diameter command from the reassigned S-CSCF, see 3GPP TS 29.228:

"If the new and previously assigned S-CSCF names sent in the Multimedia-Auth-Request command are different and the Multimedia-Auth-Request is not indicating synchronisation failure (i.e. the request does not contain auts parameter), then the HSS shall overwrite the S-CSCF name."

However, when the query is not authenticated (usually the re-registrations), the HSS would not receive a MAR Diameter command but a Cx-Put/Pull (i.e., a SAR command), and according to 3GPP these queries would be rejected:

"If the new and previously assigned S-CSCF names sent in a command other than the Multimedia-Auth-Request command are different, then the HSS shall not overwrite the S-CSCF name; instead it shall send a response to the S-CSCF indicating an error."

Two example use cases are described below to illustrate a network failure produced when the S-CSCF goes down.

Use Case 1: Registration/Re-Registration when S-CSCF has a Persistent Failure

The S-CSCF1 is serving the subscription1 when it goes to a restart condition, or is experiencing some other form of disruption.

Figure 3:
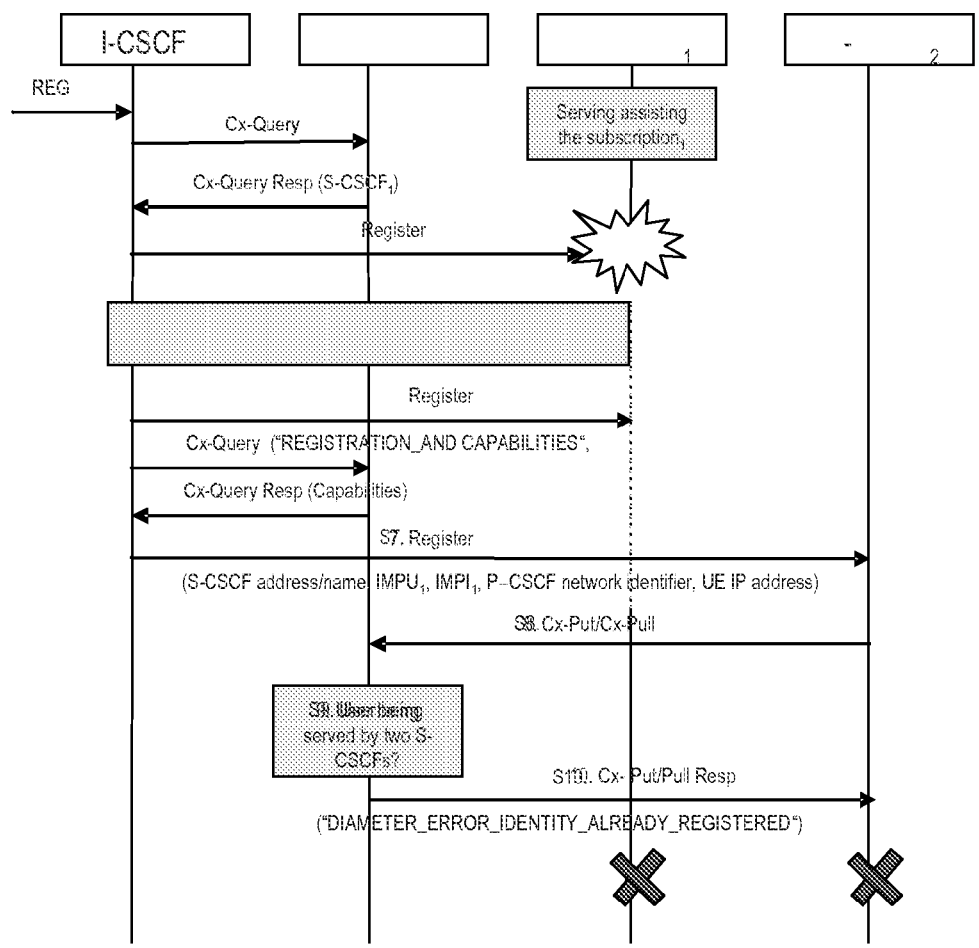
FIG. 3 illustrates failure at a S-CSCF Registration Procedure.

While S-CSCF1 is restarting, one of the following scenarios may occur:

The same user may re-register using the same Private User Identity and Public User Identity The same user may re-register another Public User Identity Another user of the same subscription may re-register a Public User Identity An example sequence flow is illustrated in FIG. 3 and is as follows:

S1 The I-CSCF asks for the S-CSCF serving the user.

S2 The user is stored in HSS as served by S-CSCF1, The HSS returns S-CSCF1.

S3 The I-CSCF forwards the REGISTER message to the received S-CSCF1.

S4 Since S-CSCF1 is down (either being restarted or has a persistent failure), the I-CSCF receives no answer and re-attempts again.

S5 When the re-attempts threshold is reached, the I-CSCF pings again to the HSS forcing the HSS to return the capabilities instead of the stored S-CSCF1. This is done by means of "Registration&Capabilities" attribute within the Cx-Query.

S6 The HSS returns the capabilities for the user.

S7 The I-CSCF selects a new S-CSCF2 and forwards the registration query to it.

S8 The new S-CSCF2 pings the HSS in a Cx-Put/Pull message to indicate that it is the S-CSCF serving the user and asking for the profile.

S9 The HSS compares the stored S-CSCF and the new S-CSCF2 coming in the received Cx-Put/Pull message.

S10 Since the two S-CSCFs are not the same, the HSS rejects the registration query to the new S-CSCF2.

The consequence of this is that the user registration will never succeed, since the HSS is mandated according to 3GPP to compare the S-CSCF allocated to serve the user (as stored in the HSS) and the S-CSCF that pings the HSS in a Cx-Put/Pull message.

A similar problem would happen with a de-registration.

Use Case 2: Terminating Call when S-CSCF has a Persistent Failure

The S-CSCF1 is serving the subscription1 when it goes to a restart condition, or is experiencing some other form of disruption.

While S-CSCF1 is restarting or has a persistent failure, a terminating call occurs for any user of the subscription1.

Figure 4:
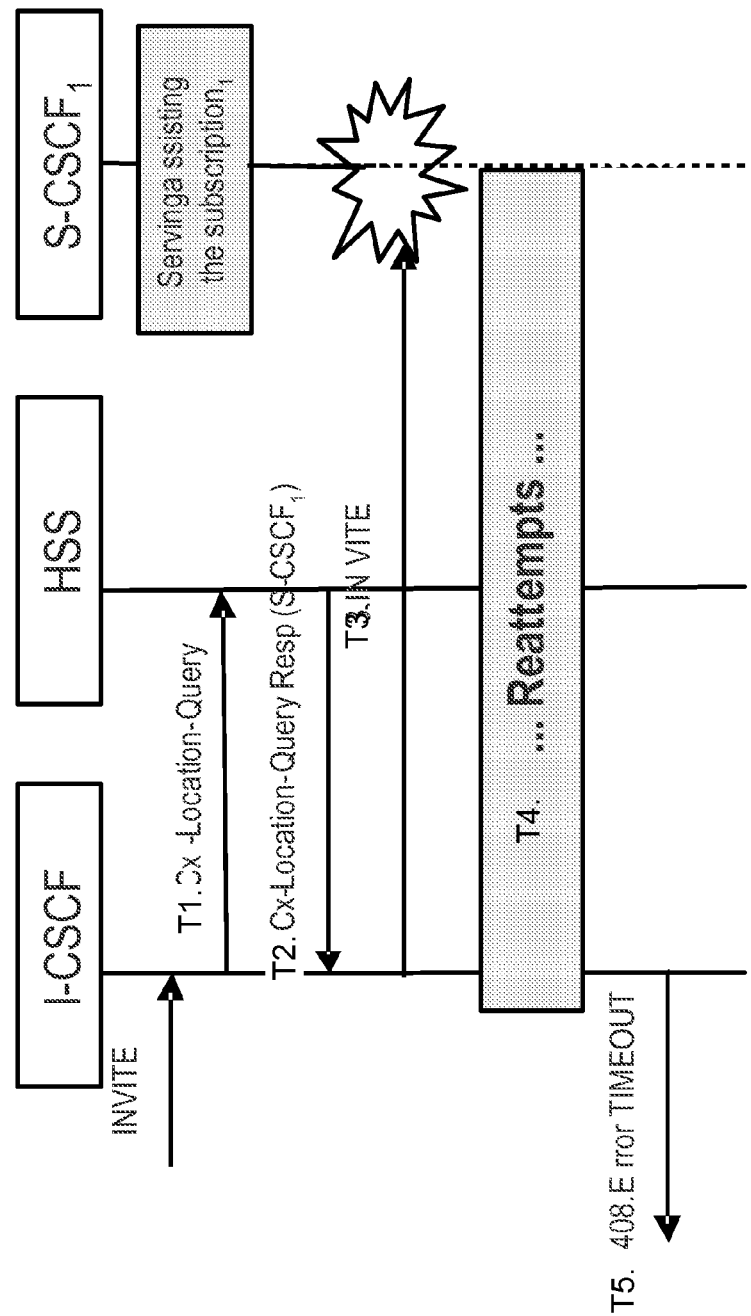
FIG. 4 illustrates failure at a S-CSCF Terminating Call Procedure.

An example sequence flow is illustrated in FIG. 4 and is as follows:

T1 The I-CSCF asks for the S-CSCF serving the user/subscription1.
T2 The HSS returns S-CSCF1, as stored.
T3 The I-CSCF forwards the INVITE message to the received S-CSCF1.
T4 Since S-CSCF1 is down (either being restarted or has a persistent failure), the I-CSCF receives no answer and re-attempts again.
T5 When the re-attempts threshold is reached, the I-CSCF returns back an error to the originating UE.
   Note that for a terminating call 3GPP does not offer the possibility to reallocate a new S-CSCF by asking for the capabilities to the HSS.

The consequence of this is that terminating calls will never succeed, since the I-CSCF is not allowed according to 3GPP to ask for the capabilities and to select a new S-CSCF.

With the above scenarios in mind, the basic idea underlying an embodiment of the present invention is to allow S-CSCF handover whenever there is persistent failure in a S-CSCF by:
   Allowing reallocation of a new S-CSCF in terminating calls
   Allowing the HSS to accept queries from a newly-allocated S-CSCF The following sections describe how an embodiment of the present invention operates in use case descriptions provided above with reference to FIGS. 3 and 4.

Embodiment Applied to Use Case 1: Registration/Re-Registration when S-CSCF has a Persistent Failure In this scenario, as described previously, S-CSCF1 is serving subscription1. S-CSCF1 has a persistent failure or is being restarted, or such-like. The I-CSCF receives a registration or re-registration for a user within subscription1.

Figure 5:
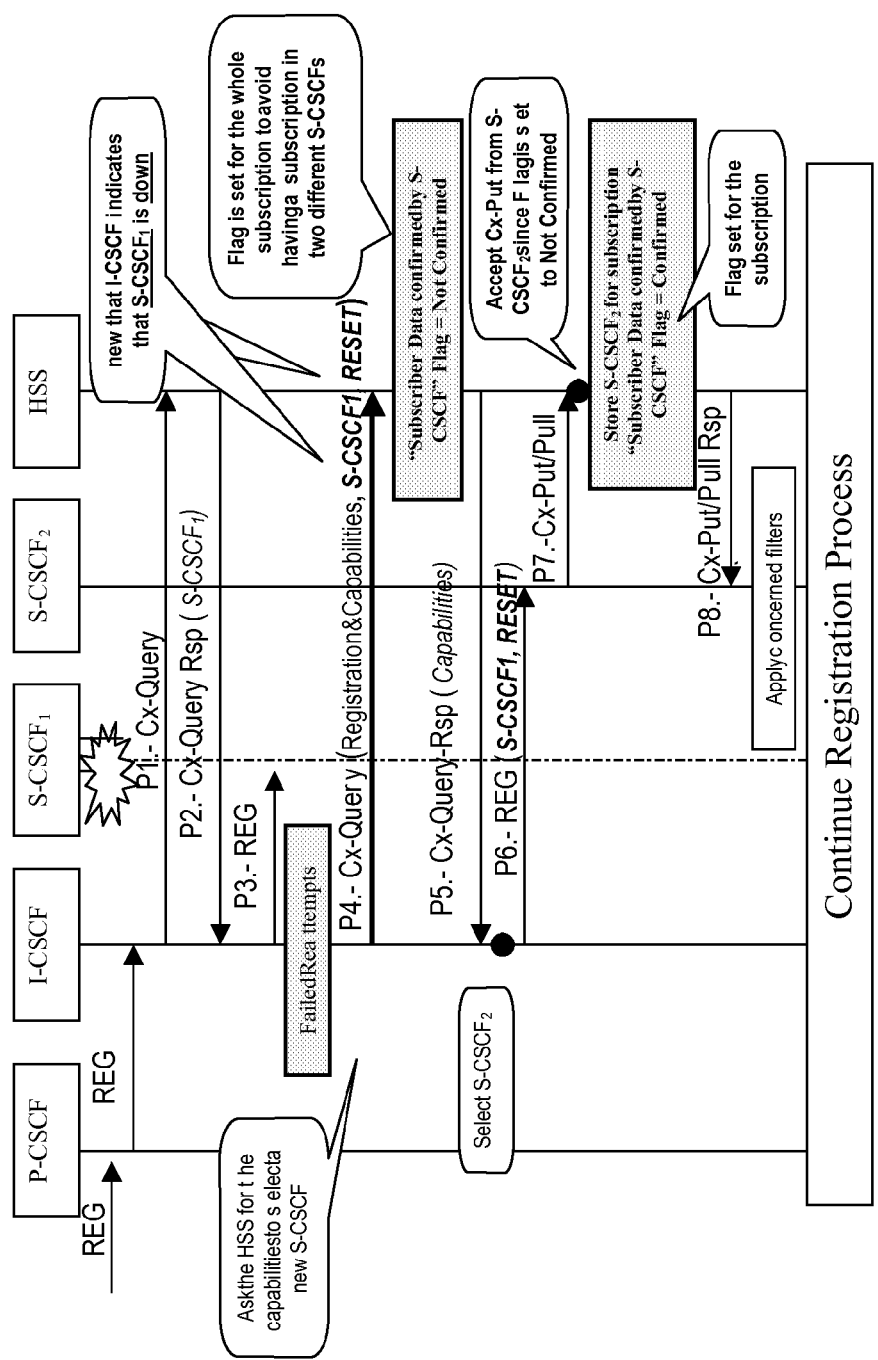
FIG. 5 illustrates schematically a method and system according to an embodiment of the present invention corresponding to the scenario described with reference to FIG. 3.

The sequence flow in this embodiment is illustrated schematically in FIG. 5 and is as follows:
P1 The I-CSCF asks for the S-CSCF serving the user/subscription to the HSS or the capabilities if no S-CSCF has been allocated for the subscription1.
P2 Since the HSS has S-CSCF1 stored, it returns S-CSCF1.
P3 The I-CSCF tries to forward the REG to the S-CSCF1 but since it is down, there is no answer.
P4 When the re-attempts threshold is reached, the I-CSCF asks the HSS for the capabilities to select a S-CSCF, indicating that S-CSCF1 is down.
P5 The HSS, at reception of such information, marks subscription1 as "Not trustable" and returns the capabilities.
P6 The I-CSCF selects a new S-CSCF2 and forwards the REG message to it.
   An optimization of this forward message is for the I-CSCF to indicate to the new S-CSCF2 that it has been reselected due to a restart procedure. This information can be used by the S-CSCF2 to pass the users back to the S-CSCF1 when it is up again (if desired by the operator for load sharing reasons). This information could be also stored in the HSS if desired.
P7 S-CSCF2 presents itself to the HSS by a Cx-Put/Pull. The HSS checks that the user has a mark indicating that the stored information is "Not trustable" so accepts the new S-CSCF2 by:
   Assigning S-CSCF2 to all users of the subscription1 that had S-CSCF1 stored; this keeps the 3GPP principle of having all user of the same subscription being served by the same S-CSCF.
   Clearing the mark of not trustable data for the subscription1.
P8 Registration call continues as for the normal 3GPP procedure.

This embodiment of the present invention differs from known procedures in at least some of the following ways:
   The mark in the Cx-Query (Step P4) to indicate:
      the affected S-CSCF and
      the reason: restart (or unreachable).
   The flag in the HSS that indicates whether or not subscription information is trustable; this allows the HSS whether or not to accept users from a S-CSCF different from the stored one.
   The indication in the SIP REGISTER message concerning:
      the affected S-CSCF and
      the reason: restart (or unreachable).
      So that S-CSCF2 knows that it has been reassigned.

The procedure for de-registration would be equivalent to that described above since it is based on the same REG SIP message and same Cx-Put/Pull commands.

Embodiment Applied to Use Case 2: Terminating Call when S-CSCF has a Persistent Failure In this scenario, as described previously, S-CSCF1 is serving subscription1. S-CSCF1 has a persistent failure or is being restarted, or such-like. The I-CSCF receives a terminating call for a user within subscription1.

Figure 6:
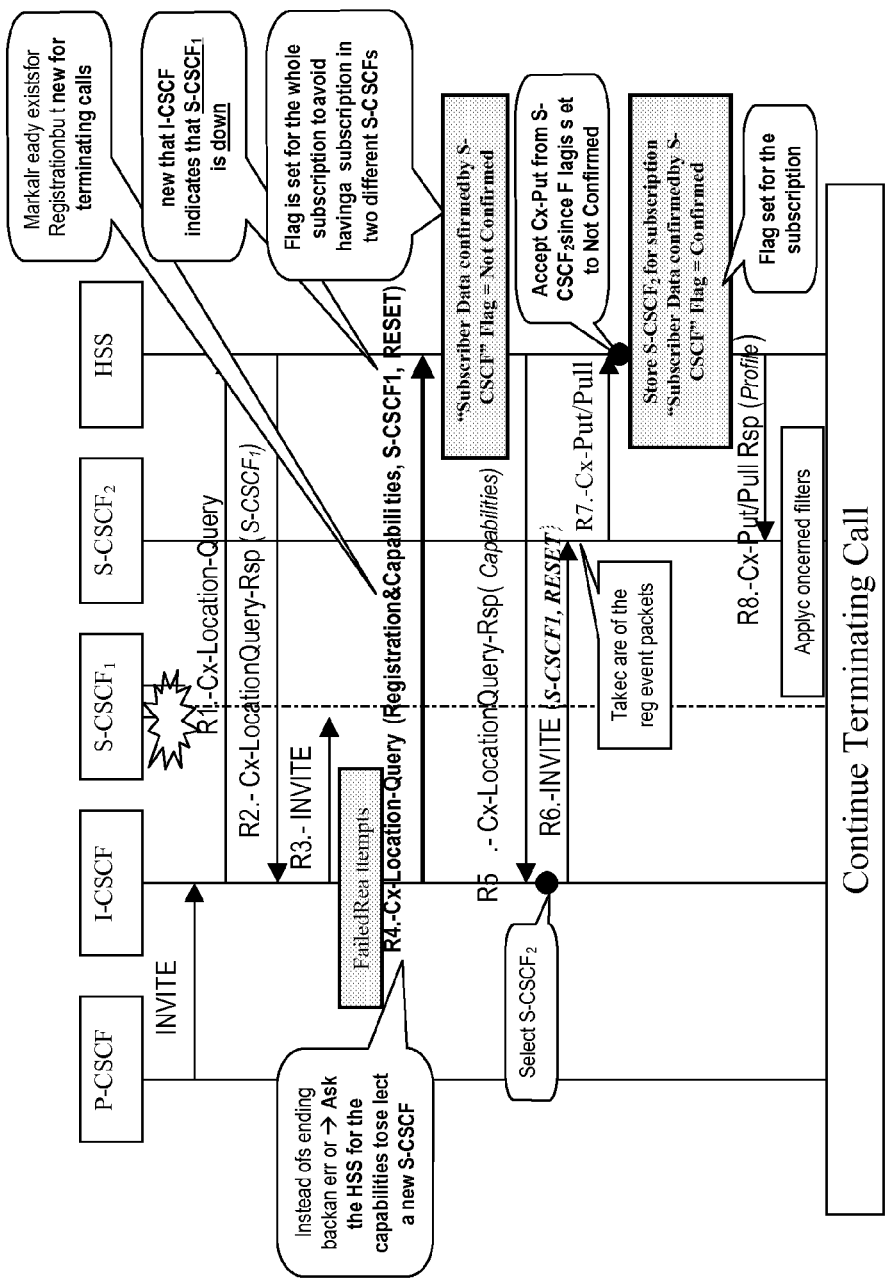
FIG. 6 illustrates schematically a method and system according to an embodiment of the present invention corresponding to the scenario described with reference to FIG. 4.

The sequence flow in this embodiment is illustrated schematically in FIG. 6 and is as follows:
R1 The I-CSCF asks for the S-CSCF serving the user/subscription1 to the HSS or the capabilities if no S-CSCF has been allocated for the subscription.
R2 Since the HSS has S-CSCF1 stored, it returns S-CSCF1.
R3 The I-CSCF tries to forward the INVITE message to the S-CSCF1 but since it is down, there is no answer.
R4 When the re-attempts threshold is reached, instead of sending back an error, the I-CSCF asks the HSS for the capabilities to select a S-CSCF, indicating that S-CSCF1 is down.
R5 The HSS, at reception of such information, marks subscription1 as "Not trustable" and returns the capabilities.
R6 The I-CSCF selects a new S-CSCF2 and forwards the INVITE message to it.
   An optimization of this forward message is for the I-CSCF to indicate to the new S-CSCF2 that it has been reselected due to a restart procedure. This information can be used by the S-CSCF2 to handover this users to the S-CSCF1 when it is up again (if desired by the operator due to load sharing reasons). This information could be also stored in the HSS if desired.
R7 The S-CSCF2 presents itself to the HSS by a Cx-Put/Pull. The HSS checks that the user has a mark indicating that the stored information is "Not trustable", and so accepts the new S-CSCF2 by:
   Assigning S-CSCF2 to all users of the subscription1 that had S-CSCF1 stored.
   Clearing the mark of not trustable data for the whole subscription.
R8 The terminating call continues as for the normal 3GPP procedure.

This embodiment of the present invention differs from known procedures in at least one of the following ways:
   The new content of the Cx-LocationQuery (step R4):
      to indicate that the contacted S-CSCF is down S-CSCF (optionally, it can further indicate a reason, such as "restart" or "unreachable"), and
      to request the HSS the capabilities to select a S-CSCF.
   The flag in the HSS that indicates whether or not subscription information is trustable; this allows the HSS to decide whether or not to accept users from a S-CSCF different from the stored one.

General

Figure 7:
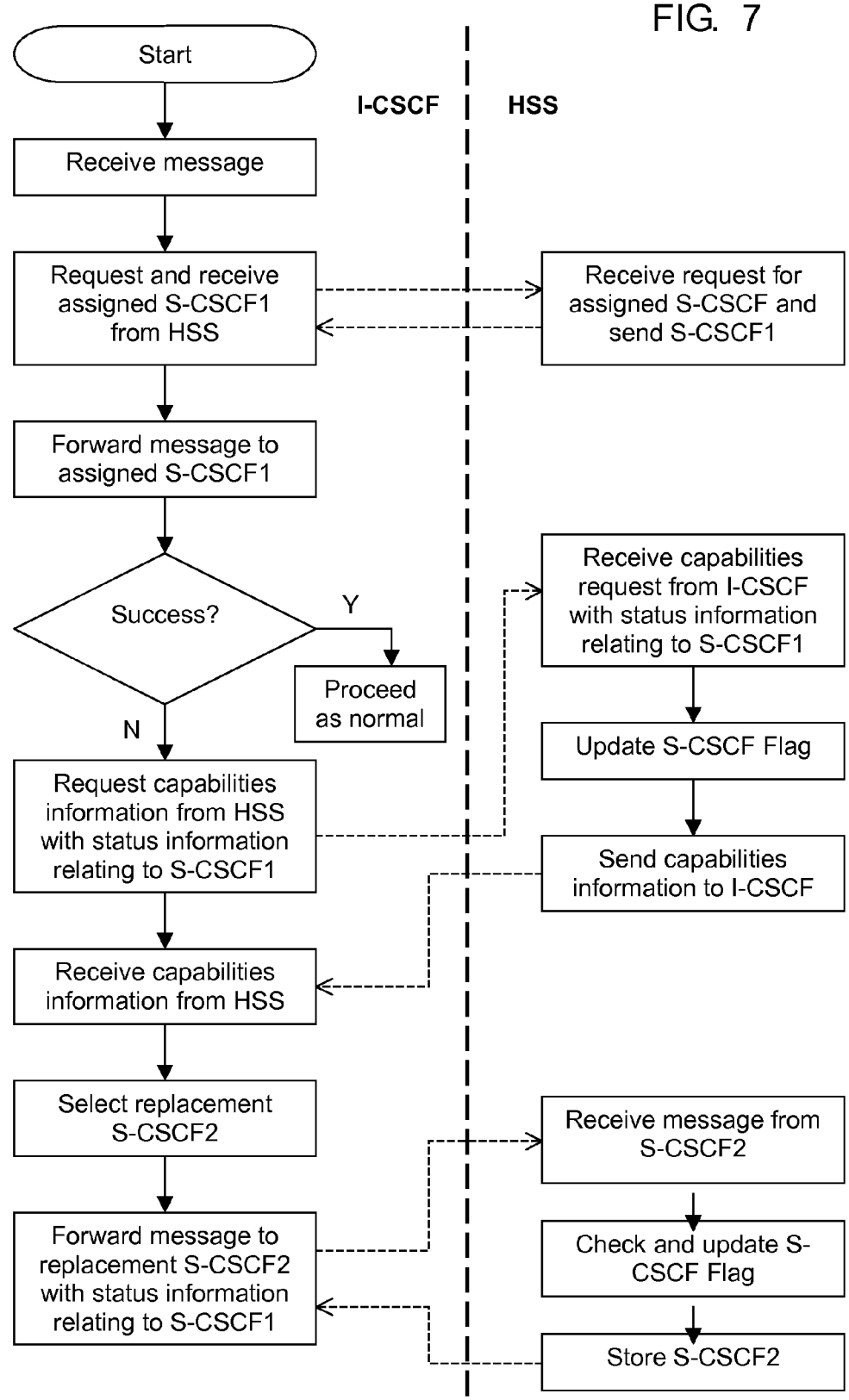
FIG. 7 illustrates schematically some steps performed by an I-CSCF and an HSS in an embodiment of the present invention.

The above description can be summarised by illustrating in general terms in FIG. 7 the steps that are performed by the I-CSCF (left-hand side) and HSS (right-hand side) nodes. It will be appreciated that the various elements illustrated in each of FIG. 7 can also be considered to represent components of an apparatus having those respective functions, and FIG. 7 is to be interpreted accordingly as also illustrating I-CSCF (left-hand side) and HSS (right-hand side) apparatus.

A system, method and apparatus according to an embodiment of the present invention allows hand-over to a new S-CSCF when the previously-assigned one has failed.

This is achieved by allowing the I-CSCF to inform the HSS that a fault occurred with the previously-assigned S-CSCF in any of the queries it sent to the HSS, for example: "Cx-Query" (UAR) for registration events, and "Cx-Location-Query" (LIR) for terminating calls. The HSS then stores a fault mark of some sort in relation to the previously-assigned S-CSCF, which permits it to accept further requests from the newly assigned S-CSCF.

FIG. 8 provides a table that defines the mapping between: stage 2 operations (illustrated in the drawings described above), and stage-3 flows (using the DIAMETER protocol to implement the stage 2 operations). The table has been reproduced from 3GPP spec TS 29.228 V7.3.0 (September 2006).

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

It will also be appreciated by the person of skill in the art that various modifications may be made to the above-described embodiments without departing from the scope of the present invention as defined by the appended claims. In particular, it will be appreciated that, although described in relation to a Universal Mobile Telecommunications System having an IP Multimedia Subsystem, the present invention is also applicable to other types of network.

The invention claimed is:

1. A method for use in an IP Multimedia Subsystem, IMS, the method comprising:
receiving a Session Initiation Protocol, SIP, message, the SIP message being associated with a user;
forwarding the SIP message to a first Serving Call/Session Control Function, S-CSCF, of the IMS assigned to provide services to the user;
when it is determined that forwarding the SIP message to the first S-CSCF has failed, sending a request message to a Home Subscriber Server, HSS, of the IMS to request capabilities information for selecting a second S-CSCF, the request message also providing status information relating to a status of the first S-CSCF; and
on receipt of the capabilities information from the HSS, selecting the second S-CSCF to provide services to the user based on the received capabilities information,
wherein the method is performed by an Interrogating Call/Session Control Function, I-CSCF, of the IMS.

2. The method as claimed in claim 1, comprising forwarding the SIP message to the second S-CSCF with the status information relating to the status of the first S-CSCF.

3. The method as claimed in claim 2, wherein the status information forwarded to the second S-CSCF indicates that the first S-CSCF is non-responsive and/or indicates a problem being experienced by the first S-CSCF.

4. The method as claimed in claim 2, wherein the status information forwarded to the second S-CSCF identifies the first S-CSCF.

5. The method as claimed in claim 2, wherein the SIP message forwarded to the second S-CSCF carrying the status information is a REGISTER or INVITE message.

6. The method as claimed in claim 2, wherein the status information forwarded to the second S-CSCF comprises information relating to an operational status of the first S-CSCF and/or information relating to a reason for the first S-CSCF being in the specified status.

7. The method as claimed in claim 1, wherein the SIP message is a SIP Register message or a SIP Invite message.

8. The method as claimed in claim 1, wherein the status information is sent to the HSS in a Diameter message.

9. The method as claimed in claim 8, wherein the Diameter message carrying the status information is a User-Authorization Request, UAR, or a Location-Info-Request, LIR, message.

10. A method for use in an IP Multimedia Subsystem, IMS, the method comprising:
receiving from an Interrogating Call/Session Control Function, I-CSCF, of the IMS a request message to request capabilities information for selecting a Serving Call/Session Control Function, S-CSCF, the request message also providing status information relating to a status of a first S-CSCF assigned to provide services to a user; and
based on the status information, setting an indicator maintained at or accessible to the HSS so as to indicate an uncertain status in relation to the first S-CSCF,
wherein the method is performed by a Home Subscriber Server, HSS, of the IMS.

11. The method as claimed in claim 10, further comprising:
subsequently receiving a message from a second S-CSCF other than the first S-CSCF;
checking whether the indicator is set to indicate the uncertain status in relation to the first S-CSCF and, if so, replacing the first S-CSCF with the second S-CSCF as being the S-CSCF assigned to provide services to the user; and
updating the indicator so as not to indicate the uncertain status in relation to the second S-CSCF.

12. The method as claimed in claim 11, further comprising rejecting the message received from the second SCSF when the indicator is not set to indicate the uncertain status in relation to the first S-CSCF.

13. The method as claimed in claim 10, further comprising setting the indicator to indicate the uncertain status in relation to the first S-CSCF when the status information indicates that the first S-CSCF is non-responsive.

14. The method as claimed in claim 10, wherein the status information received from the I-CSCF indicates that the first S-CSCF is non-responsive and/or indicates a problem being experienced by the first S-CSCF.

15. The method as claimed in claim 10, wherein the status information received from the I-CSCF identifies the first S-CSCF.

16. The method as claimed in claim 10, wherein the status information is received from the I-CSCF in a Diameter message.

17. The method as claimed in claim 16, wherein the Diameter message carrying the status information is a User-Authorization Request, UAR, or a Location-Info-Request, LIR, message.

18. The method as claimed in claim 10, wherein the status information received from the I-CSCF comprises information relating to an operational status of the first S-CSCF and/or information relating to a reason for the first S-CSCF being in the specified status.

19. A method for use in an IP Multimedia Subsystem, IMS, the method comprising:
receiving a Session Initiation Protocol, SIP, message from an Interrogating Call/Session Control Function, I-CSCF, of the IMS with status information relating to a status of a first Serving Call/Session Control Function, S-CSCF of the IMS assigned to provide services to a user; and
storing in a second S-CSCF of the IMS the received status information in relationship with information about the user, the second S-CSCF being different from the first S-CSCF,
wherein the method is performed by the second S-CSCF.

20. The method as claimed in claim 19, wherein the status information received from the I-CSCF indicates that the first S-CSCF is non-responsive and/or indicates a problem being experienced by the first S-CSCF.

21. The method as claimed in claim 19, wherein the status information received from the I-CSCF identifies the first S-CSCF.

22. The method as claimed in claim 19, wherein the SIP message received from the I-CSCF is a SIP Register message or a SIP Invite message.

23. The method as claimed in claim 19, wherein the status information received from the I-CSCF comprises information relating to an operational status of the first S-CSCF and/or information relating to a reason for the first S-CSCF being in the specified status.

24. An Interrogating Call/Session Control Function, I-SCSF, apparatus of an IP Multimedia Subsystem, IMS, the I-SCSF apparatus comprising:
a Session Initiation Protocol, SIP, message device and a Serving Call/Session Control Function, S-CSCF, selection device,
wherein the SIP message device is structured to
receive a SIP message originating from a user,
forward the SIP message to a first S-CSCF assigned to provide services to the user,
send a request message to a Home Subscriber Server, HSS, of the IMS upon a determination that the first S-CSCF is not available, the request message including a request for capabilities information necessary to serve the user and also including status information related to a status of the first S-CSCF, and
receive the capabilities information from the HSS, and
wherein the S-CSCF selection device is structured to select a second S-CSCF to provide services to the user, the second S-CSCF being different from the first S-CSCF.

25. A Home Subscriber Server, HSS, apparatus of an IP Multimedia Subsystem, IMS, the HSS apparatus comprising:
an IMS message device structured to receive a request message from an Interrogating Call/Session Control Function, I-CSCF, of the IMS, the request message including a request for capabilities information necessary to serve a user and also including status information related to a status of a first S-CSCF assigned to provide services to the user; and
an indication setting device structured to set an indicator maintained at or accessible to the HSS to indicate an uncertain status in relation to the first S-CSCF.

26. A second Serving Call/Session Control Function, S-CSCF, apparatus of an IP Multimedia Subsystem, IMS, the second S-CSCF apparatus comprising:
a Session Initiation Protocol, SIP, message device structured to
receive a Session Initiation Protocol, SIP, message from an Interrogating Call/Session Control Function, I-CSCF, of the IMS with status information relating to a status of a first S-CSCF assigned to provide services to a user, and
store in the S-CSCF the received status information in relationship with information about the user.

27. A non-transitory computer readable medium storing therein a computer program, which when loaded into a computer of an Interrogating Call/Session Control Function, I-SCSF, apparatus causes the I-SCSF apparatus to perform a method comprising:
receiving a Session Initiation Protocol, SIP, message originating from a user;
forwarding the SIP message to a first Serving Call/Session Control Function, S-CSCF, of the IMS assigned to provide services to the user;
when the forwarding the SIP message to the first S-CSCF is determined to have failed, sending a request message to a Home Subscriber Server, HSS, of the IMS to request capabilities information for selecting a S-CSCF, the request message also including an availability indicator associated with the first S-CSCF, the availability indicator being set to indicate an unavailability of the first S-CSCF;
receiving the capabilities information from the HSS; and,
selecting a second S-CSCF, different from the first S-CSCF, to provide services to the user based on the received capabilities information.

28. The non-transitory computer readable medium loadable to the computer of the I-CSCF of claim 27, wherein the method stored therein further comprises:
forwarding the SIP message to the second S-CSCF along with a reselection indicator corresponding to the first S-CSCF,
wherein the reselection indicator is set to indicate that the second S-CSCF has been selected due to the unavailability of the first S-CSCF.

29. A non-transitory computer readable medium storing therein a computer program, which when loaded into a computer of a Home Subscriber Server, HSS, apparatus of an IP Multimedia Subsystem, IMS, causes the HSS apparatus to perform a method comprising:
receiving from an Interrogating Call/Session Control Function, I-CSCF, of the IMS a request message to request capabilities information for selecting a Serving Call/Session Control Function, S-CSCF, the request message also including an availability indicator associated with a first S-CSCF assigned to provide services to the user; and
setting a status indicator related to the first S-CSCF based on the received availability indicator, the status indicator being maintained at or accessible to the HSS,
wherein in the step of setting the status indicator, when the availability indicator indicates an unavailability of the first S-CSCF, the status indicator is set so as to indicate an uncertain status.

30. The non-transitory computer readable medium loadable to the computer of the HSS of claim 29,
wherein the user is one of one or more users associated with a first subscription, wherein the first S-CSCF is assigned to serve all users associated with the first subscription, wherein the status indicator reflects a status of the first subscription, and wherein the method stored in the non-transitory computer readable medium further comprises setting the status indicator to indicate that subscription information of the first subscription is not trustable when the availability indicator indicates the unavailability of the first S-CSCF.

31. The non-transitory computer readable medium loadable to the computer of the HSS of claim 30, wherein the method stored therein further comprises:

receiving a presentation message from a second S-CSCF different from the first S-CSCF subsequent to receiving the request message from I-CSCF, the presentation message including a reselection indicator corresponding to the first S-CSCF;

checking whether the status indicator indicates that the subscription information of the first subscription is not trustable when the reselection indicator indicates that the second S-CSCF has been selected due to the unavailability of the first S-CSCF; and assigning the second S-CSCF as being the S-CSCF for providing the services to the user when the status indicator indicates that the subscription information of the first subscription is not trustable.

32. The non-transitory computer readable medium loadable to the computer of the HSS of claim 31, wherein the method stored therein further comprises:

assigning the second S-CSCF as being the S-CSCF for providing the services to all users associated with the first subscription when the status indicator indicates that the subscription information of the first subscription is not trustable.

33. The non-transitory computer readable medium loadable to the computer of the HSS of claim 31, wherein the method stored therein further comprises:

rejecting the second S-CSCF when the status indicator does not indicate that the subscription information of the first subscription is not trustable.

34. A non-transitory computer readable medium storing therein a computer program, which when loaded into a computer of a second Serving Call/Session Control Function, S-SCSF, apparatus causes the second S-SCSF apparatus to perform a method comprising:

receiving a Session Initiation Protocol, SIP, message and a reselection indicator from an Interrogating Call/Session Control Function, I-CSCF, of the IMS, the SIP message being associated with a user, and the reselection indicator corresponding to a first S-CSCF assigned to provide services to the user;

storing in the second S-CSCF the received status information in relationship with information about the user; and sending a presentation message to a Home Subscriber Server, HSS of the IMS when the reselection indicator is set to indicate an unavailability of the first S-CSCF.

35. The non-transitory computer readable medium loadable to the computer of the second S-CSCF of claim 34, wherein the method stored therein further comprises:

handing over the user back to the first S-CSCF when the first S-CSCF becomes available.

\* \* \* \* \*